11,405,529 B2

United States Patent
Bhaskar et al.

(10) Patent No.: US 11,405,529 B2
(45) Date of Patent: Aug. 2, 2022

(54) COLOR TABLE GENERATION

(71) Applicant: HEWLETT-PACKARD DEVELOPMENT COMPANY, L.P., Spring, TX (US)

(72) Inventors: Ranjit Bhaskar, Vancouver, WA (US); Morgan T Schramm, Vancouver, WA (US); Erik A Anderson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/500,386

(22) PCT Filed: May 15, 2018

(86) PCT No.: PCT/US2018/032810
§ 371 (c)(1),
(2) Date: Oct. 2, 2019

(87) PCT Pub. No.: WO2019/221716
PCT Pub. Date: Nov. 21, 2019

(65) Prior Publication Data
US 2021/0368070 A1    Nov. 25, 2021

(51) Int. Cl.
*H04N 1/60* (2006.01)

(52) U.S. Cl.
CPC .......... *H04N 1/6025* (2013.01); *H04N 1/603* (2013.01); *H04N 1/6008* (2013.01); *H04N 1/6027* (2013.01); *H04N 1/6058* (2013.01)

(58) Field of Classification Search
CPC combination set(s) only.
See application file for complete search history.

(56) References Cited

U.S. PATENT DOCUMENTS

| | | | |
|---|---|---|---|
| 7,030,885 B2 | 4/2006 | Kim et al. |
| 7,379,207 B2 | 5/2008 | Harrington |
| 8,270,032 B2 | 9/2012 | Benedicto et al. |
| 8,625,160 B2 | 1/2014 | Hoshino |
| 9,042,648 B2 | 5/2015 | Wang et al. |
| 9,619,708 B2 | 4/2017 | Hong |

(Continued)

FOREIGN PATENT DOCUMENTS

EP    0793377 A2 *  9/1997   .......... H04N 1/6058
JP    2010098527 A *  4/2010

*Primary Examiner* — Barbara D Reinier
(74) *Attorney, Agent, or Firm* — Dicke, Billig & Czaja, PLLC

(57) ABSTRACT

Target color table generated from source color tables. A first significance factor is assigned to a first node in a first source color table. The first node in the first source color table corresponds with a color input in a first color space and provides a first print substance formulation in a second color space. A second significance factor is assigned to a second node in a second source color table. The second node in the second source color table corresponds with the color input in the first color space and provides a second print substance formulation in the second color space. A third node in target color table is generated from the first and second nodes based on the first and second significance factors. The third node corresponds with the color input in the first color space and provides a third print substance formulation in the second color space.

15 Claims, 1 Drawing Sheet

(56) References Cited

U.S. PATENT DOCUMENTS

| | | |
|---|---|---|
| 9,633,050 B2 | 4/2017 | Lenka et al. |
| 2003/0098986 A1 | 5/2003 | Pop |
| 2005/0094169 A1* | 5/2005 | Berns .................. H04N 1/6033 |
| | | 358/1.9 |
| 2008/0252931 A1 | 10/2008 | Mestha et al. |
| 2014/0071177 A1 | 3/2014 | Chu et al. |
| 2015/0092204 A1* | 4/2015 | Tashiro .............. G06K 15/1878 |
| | | 358/1.9 |
| 2015/0227810 A1 | 8/2015 | Perazzi et al. |
| 2017/0213330 A1 | 7/2017 | Pudipeddi et al. |
| 2021/0006687 A1* | 1/2021 | Morovic ............. H04N 1/6008 |

* cited by examiner

COLOR TABLE GENERATION

BACKGROUND

Color management systems deliver a controlled conversion between color representations of various devices, such as image scanners, digital cameras, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

DETAILED DESCRIPTION

Figure 1:
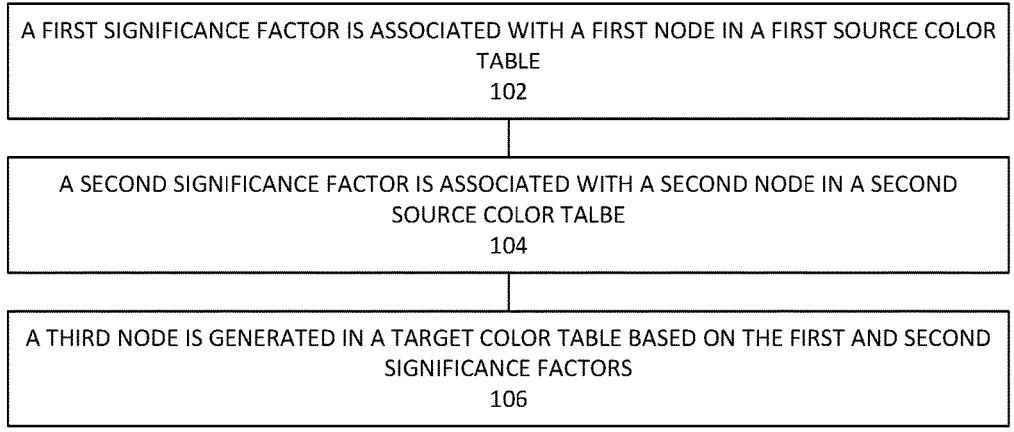
FIG. 1 is a block diagram illustrating an example method.

A color space is a system having axes and that describes color numerically. Some output devices, such as printing devices, may employ a type of subtractive color space, which can include a type of cyan-magenta-yellow-key (black) (CMYK) color space, while some software applications and display devices may employ a type of additive color space, which can include a type of red-green-blue (RGB) color space. For example, a color represented in an RGB color space has a red channel value, a green channel value, and a blue channel value, and a color represented in a CMYK color space has a cyan channel value, a magenta channel value, a yellow channel value, and a black or key channel value, that combined numerically represent the color. A color gamut for a device is a property of the device that includes the range of color (and density/tonal values) that the device can produce as represented by a color space. As used in this disclosure, a subtractive color component includes the cyan, magenta, and yellow channels in the subtractive color space and does not include the black channel in the subtractive color space.

A color management resource, is a set of data based on the color gamut characterization in a color space. A color profile is an example of a color management resource. A color profile is a formal set of data that characterizes the color gamut in a color space. In one example, a color profile can describe the color attributes of a particular device or viewing specifications with a mapping between the device-dependent color space, such as a source or target color space, and a device-independent color space, such as profile connection space (PCS), and vice versa. The mappings may be specified using tables such as look up tables, to which interpolation can be applied, or through a series of parameters for transformations. Devices and software programs—including printing devices, monitors, televisions, and operating systems—that capture or display color can include color profiles that comprise various combinations of hardware and programming. An ICC profile is an example color profile that is a set of data that characterizes a color space according to standards promulgated by the International Color Consortium (ICC). Examples of this disclosure using particular profiles, such as ICC profiles, however, are for illustration only, and the description is applicable to other types of color profiles, color management resources, or color spaces.

The ICC profile framework has been used as a standard to communicate and interchange between various color spaces. An ICC output profile includes color table pairs, so-called A2B and B2A color look up tables, where A and B denote the device-dependent and the device-independent color spaces, respectively. For different devices, there are different look up table rendering intent pairs. For example, an ICC profile allows for three color table pairs, enumerated from 0 to 2, enabling the user to choose from one of the three possible rendering intents: perceptual, colorimetric, or saturation. ICC profiles are often embedded in color documents as various combinations of hardware and programming to achieve color fidelity between different devices. The size of color tables will increase with finer sampling of the spaces and larger bit depths.

Color tables that provide transformations between various color spaces are extensively used in color management, common examples being the transformations from device independent color spaces (such as CIELAB, i.e., L*a*b*) to device dependent color spaces (such as RGB or CMYK) and vice versa. The mappings may be specified using tables such as single dimensional or multidimensional look-up tables, to which interpolation can be applied, or through a series of parameters for transformations. A color table can include an array or other data structure stored on a memory device that replaces runtime computations with a simpler array indexing operation as a color look-up table. Color tables can also include monochromatic and greyscale color tables. In a greyscale table, for example, the value corresponding to a source color space such as RGB can be of luminous intensity.

Printing devices, including printing devices that print in color mode and printing devices that print in black and white or monochromatic mode, employ color management systems including color management resources to deliver a controlled conversion between color representations of various devices, such as image scanners, digital cameras, computer monitors, printers, and software applications including operating systems, browsers, and photo and design programs often to a subtractive color space or a monochromatic color space such as greyscale. In general, printing devices apply a print substance, which can include printing agents or colorants often in a subtractive color space or black, to a medium via a device component generally referred to as a print head. A medium can include various types of print media, such as plain paper, photo paper, polymeric substrates and can include any suitable object or materials to which a print substance from a printing device are applied including materials, such as powdered build materials, for forming three-dimensional articles. Print substances, such as printing agents, marking agents, and colorants, can include toner, liquid inks, or other suitable marking material that may or may not be mixed with fusing agents, detailing agents, or other materials and can be applied to the medium.

Printing devices often employ color tables to provide transformations between input color spaces and subtractive color spaces to determine corresponding formulations of print substance amounts, such as print substance volumes, to render the intended colors. In one example, printing devices often employ color tables including multidimensional color look-up tables to provide transformations between different color spaces such as from input device-independent colors to CMYK print substance amounts in the case of two-dimensional printing devices for printing on substrates or, in the case of three-dimensional printing devices, printing agent amounts for printing on a powder or other material. Many colors in the gamut of a CMYK color space for printing devices can be rendered from just the set of subtractive colors of cyan, magenta, and yellow and, in some color resource models, do not include a black channel component. In many printing devices and printing modes, however, an achromatic black channel component can be added to some of colors in the CMYK color space order to reduce subtractive color print substance consumption for some darker colors, stabilize neutral color such as in the grey tones, and to improve printability of blacks.

For printing devices, color management resources including the color tables can be embedded in memory devices storing the printer firmware or other hardware such as a controller. In some examples, the particular color transform of the color management resource may be colorant-dependent, such as dependent on the particular formulation of each of the print substance included in a supply component such as a print substance cartridge, and information regarding the color gamut characterization in the color management resource can be stored on a memory device located on the cartridge for use with the printing device such as its firmware or other hardware.

In one example, a color management resource for a printing device may include a plurality of multidimensional color tables that can correspond to media, rendering intents, and colorant axes of a color gamut, among other things, included in a color profile. In general, a profile can include N color tables to be processed, such as $CLUT_1$, $CLUT_2, \ldots, CLUT_N$, and the input color space includes $J_{in}$ channels. In one example, multiple color tables representing different rendering intents can be included with one ICC profile. Additionally, the output color space includes $J_{out}$ channels, and in many examples of an ICC profile $J_{in}$ and $J_{out}$ can be 3 or 4 channels. For each output channel, the corresponding lookup table contains $M^{J_{in}}$ nodes. For example, each color table can include $M^4$ nodes for each of the cyan, magenta, yellow, and black colorants corresponding with each print substance color used in the printing device or $M^3$ nodes for each of the red, green, and blue three additive primaries corresponding with each primary color used in the display device.

As an example used for illustration in this disclosure, a color table to convert an input value in an RGB color space to an output value representing a print substance formulation in a CMYK space may include $17^3$ nodes, or 4913 nodes. In one example, each color in the example RGB color space may be represented as an eight bits per channel input. In one sample provided for a color table, each channel can have an eight bit input value selected from the set of seventeen input values including 0x00, 0x10, 0x20 . . . 0xE0, 0xF0, and 0xFF. For instance, the input 0x0000FF may represent blue in the example RGB color space, the input 0x00FFFF may represent cyan or aqua blue in the example RGB color space, and the input 0x000080 may represent navy blue in the example RGB color space. The color table maps the inputs in the RGB color space to eight, ten, or twelve bit values per channel in the CMYK color space that can correspond with a print substance formulation based on a selected printer dots per inch (dpi) cell for a drop weight of a pen and the print mode. In an example of an eight bit per channel CMYK color space output, a color table may receive a twenty-four bit input from the RGB color space and produce a thirty-two bit output representing a print substance formulation in the CMYK color space as follows:

| Node No. | RGB Input | | CMYK Output |
|---|---|---|---|
| 1 | 0x000000 | -> | 0x000000C8 |
| 2 | 0x000010 | -> | 0x131000B4 |
| 3 | 0x000020 | -> | 0x161300A7 |
| . | . | | . |
| . | . | | . |
| . | . | | . |
| 4912 | 0xFFFFF0 | -> | 0x00001D00 |
| 4913 | 0xFFFFFF | -> | 0x00000000 |

Thus, the example color in the RGB color space having an input value of 0x000020 into the color table, which corresponds with a red channel value of 0x00, a green channel value of 0x00, and a blue channel value of 0x20, would be converted to a print substance formulation in the CMYK color space having a an amount of cyan print substance with a value, or cyan channel value, of 0x16, a magenta channel value of 0x13, a yellow channel value of 0x00, and a black channel value of 0xA7.

Often, a color gamut for the input color space will include more than $M^{J_{in}}$ colors. In the present example, the color gamut for a printing device often includes more than 4913 colors, and print substance formulations for certain input colors are not be found in the color table. For example, the input value 0x4169E1 may represent royal blue in the example RGB color space, but would not correspond with a node in the color table and thus would not map to a print substance formulation in the table. The example royal blue would appear between nodes having input values 0x4060E0 and 0x5070F0 and may be considered an intermediate color. Print substance formulations for such intermediate colors can be determined via interpolation using nodes in the color table with firmware for the printing device.

Printing devices, for example, include a set of different color tables to provide different print formulation outputs for a given color input. For instance, a printing device may include a full-color color table for color printing, a draft mode color table for economical use of print substances, and a greyscale color table for black and white printing. Additionally, a printing device may include multiple sets of color tables for different print media. Many color tables are configured to emphasize characteristics such as image quality and other color tables may be configured to emphasize other characteristics such as print speed, economy, or reducing print artifacts. A color table can be generated to emphasize a single characteristic in a relatively straightforward manner. Generating a color table to emphasize multiple characteristics, however, is relatively difficult.

A simple mechanism of generating a target color table from multiple source color tables having different characteristics of emphasis is to average the print formulation outputs for each node. To illustrate an example of averaging, a first source color table, which is configured to emphasize a first characteristic, may include a print formulation output having a cyan channel value of 0x00 at a node for a given color input. A second source color table, which is configured to emphasize a second characteristic, may include a print formulation having a cyan channel value of 0x08 at a node for the given color input. Upon averaging, a target color table, which attempts to merge the characteristics of the source tables, may include a print formulation having a cyan channel value of 0x04 at the node for the given color input. In the averaging mechanism, the first and second print substance formulations contribute equally to create the third print substance formulation average.

In many circumstances, however, the output print substance formulations for a given color input vary significantly in different source color tables, and averaging produces a random print substance formulation that does not include an advantage of either source color map. One example of illustration includes an attempt to merge the characteristics of a full-color color table, such as the vivid and full chroma primary and secondary colors, with the characteristics of a high-quality greyscale color table, such as the high quality neutral axis colors including greys. The greyscale color table includes print substance formulation having black channel values in each color whereas the print substance formulations in the primary and secondary colors may not include black channel print values in the full-color color table. Averaging would introduce a black channel component into each primary and secondary color, which would be undesirable because it would lower the chroma and darken the appearance of the primary and secondary color outputs in the target color map.

The disclosure sets out a method of merging source color tables that can preserve the desirable features or characteristics of various nodes in the target color map. Each source color table can be assigned a significance profile that ascribes a significance factor to a node, a subset of nodes, or the entire set of nodes of the source color table. The significance profile can be generated to emphasize or deemphasize a feature or characteristic of the source color table. For example, a significance profile for a full-color color table can emphasize nodes that produce primary and secondary colors, and a significance profile for a greyscale color table can emphasize nodes that produce greys. In some examples, a source color table may include a plurality of significance profiles each emphasizing (or deemphasizing) a selected feature or characteristic. Multiple source color tables can be merged together via the significance profiles to produce a target color table having compound qualities that can retain the desirable characteristics of each source color table. In one example, a target color table produced from the merged full-color color table and greyscale color table can include nodes that produce vivid and full chroma primary and secondary colors as well as high quality greys and neutrals.

FIG. 1 illustrates an example method 100 for merging aspects of a plurality of source color tables to generate a target color table. The plurality of source color tables can include a first source color table and a second source color table. In some combinations, an additional source color table may be merged with the first and second source color tables to generate the target color table. In the example method 100, a first significance factor is associated with, such as ascribed to, a first node in the first source color table at 102. The first node in the first source color table corresponds with a color input in a first color space that provides a first print substance formulation in a second color space. A second significance factor is associated with, such as ascribed to, a second node in the second source color table at 104. The second node in the second source color table corresponds with the color input in the first color space that provides a second print substance formulation in the second color space. In one example, the first and second significance factors are stored in the first and second source color tables, respectively. In another example, the first or second significance factors are stored in separate data structures from the first and second source color tables, respectively as significance profiles. A third node in a target color table is generated based on the first significance factor and the second significance factor at 106. The third node corresponds with the color input in the first color space that provides a third print substance formulation in the second color space. The third print substance formulation can be selected from one of the first and second print substance formulations based on the first and second significance factors, or the third print substance formulation can be a combination of the first and second print substance formulation based on the first and second significance factors such as a weighted average. Still further, the third print substance formulation can be selected from a fourth print substance formulation, which is independent of the first and second print substance formulations, based on the first and second significance factors.

The first and second source color tables can include a plurality of nodes that are merged to form a target color table having a plurality of nodes. For example, the first source color table includes a first amount of nodes and second source color tables includes a second amount of nodes, and the target color table includes a third amount of nodes. In one example, the first amount of nodes can equal the second amount of nodes, which can equal the third amount of nodes. In another example the first amount of nodes does not equal the second amount of nodes, and the third amount of nodes can equal one of the first amount of nodes and the second amount of nodes. Corresponding nodes in the first and second source table, such as the first node and the second node, can include the same color input, which can also correspond with the color input of the third node, rather than by node number or some other index mechanism.

In one example, the first and second significance factors include first and second weighted significance values, respectively. The weighted significance value can be a quantity including a whole number or real number assigned to the node based on a significance of the print substance formulation for a selected feature of the source color table. In one example, the weighted significance value can be selected to be between 0.0 and 1.0, and can be used for comparison of significance factors or weighted averaging of the print substance formulations corresponding with the associated nodes.

The selected feature, or characteristic, of the source color table can include an aspect of a color or print substance formulation that can be emphasized, or deemphasized when merged with another source table, and the aspect can relate a node or set of nodes of a selected trait. Examples of features that can be emphasized can include the quality of certain colors or hues and the amount of print substance used in the corresponding print substance formulation. Significance factors can be ascribed to the nodes based the features. For example, a user may desire the appearance or quality of skin tones in a first source color table and would want to preserve the print formulation for the skin tones when merged with another source color table. A significance profile can ascribe a relatively high significance factor to nodes of the skin tone colors and may ascribe a relatively low significance factor to nodes of the other colors.

In one example, a user may prefer the appearance of primary or secondary colors, such as red, green, blue, cyan, magenta and yellow, of a full color source color table. The significance profile for a vivid color characteristic of the full color source color table may ascribe a relatively high significance factor, such as a relatively high weighted significance value, to the primary and secondary colors. The significance profile of the full color source color table may also ascribe a relatively low significance factor, such as a relatively low weighted significance value, to the neutral or grey colors, or colors in which the input values of the red channel value are generally equal to the value of the green channel value and the blue channel value, such as R=G=B. A resulting significance profile, or set of significance factors, that are ascribed to the nodes of the full color source color table can be as follows:

| Node No. | RGB Input | | Significance Factor (Color) |
|---|---|---|---|
| 1 | 0x000000 | -> | 0.00 |
| 2 | 0x000010 | -> | 0.05 |
| 3 | 0x000020 | -> | 0.10 |
| . | . | | . |
| . | . | | . |
| . | . | | . |
| 16 | 0x0000F0 | | 0.95 |
| 17 | 0x0000FF | | 1.00 |
| 18 | 0x001000 | | 0.05 |
| . | . | | . |
| . | . | | . |
| . | . | | . |
| 4912 | 0xFFFFF0 | -> | 0.95 |
| 4913 | 0xFFFFFF | -> | 1.00 |

In the example, nodes corresponding with primary color input values, such as nodes 1-3 and 18, are ascribed a relatively high weighted significance value; and nodes in which the input values of the red channel value are generally equal to the value of the green channel value and the blue channel value, such as nodes 16, 17, 4912, and 4913, are ascribed a relatively low weighted significance value.

In another example, a user may prefer the appearance of greys or neutral colors in a high quality greyscale color table. A significance profile for a high quality neutral color or greys characteristic of the greyscale color table may ascribe a relatively high significance factor, such as a relatively high weighted significance value, to the neutral or grey colors, or colors in which the input values of the red channel value are generally equal to the value of the green channel value and the blue channel value, such as R=G=B. The significance profile of the greyscale color table may ascribe a relatively low significance factor, such as a relatively low weighted significance value, can be ascribed to the primary and secondary colors. A resulting significance profile, or set of significance factors, that are associated with nodes of the high quality greyscale source color table can be as follows:

| Node No. | RGB Input | | Significance Factor (Greys) |
|---|---|---|---|
| 1 | 0x000000 | -> | 1.00 |
| 2 | 0x000010 | -> | 0.95 |
| 3 | 0x000020 | -> | 0.90 |
| . | . | | . |
| . | . | | . |
| . | . | | . |
| 16 | 0x0000F0 | | 0.05 |
| 17 | 0x0000FF | | 0.00 |
| 18 | 0x001000 | | 0.95 |
| . | . | | . |
| . | . | | . |
| . | . | | . |
| 4912 | 0xFFFFF0 | -> | 0.05 |
| 4913 | 0xFFFFFF | -> | 0.00 |

In the example, nodes in which the input values of the red channel value are generally equal to the value of the green channel value and the blue channel value, such as nodes 16, 17, 4912, and 4913, are ascribed a relatively high weighted significance value; and nodes corresponding with primary color input values, such as nodes 1-3 and 18, are ascribed a relatively low weighted significance value.

The third node includes a third print substance formulation for the color input that is based on the first and second significance factors at 106 from the significance profiles. For example, the third print substance formulation for the given color input can be selected from one of the first and second print substance formulations based on the first and second significance factors. The first and second significant factors ascribed to the nodes can be compared to each other, and one of the first print substance formulation and second print substance formulation is selected to be the third print substance formulation for the given color input based on criteria of the comparison. In one example, the first and second significance factors can be Boolean values of true or false, and the print substance formulation corresponding with the significance factor of true can be selected as the third print substance formulation. In another example, the first and second significance factors can include first and second weighted significance values, respectively. The weighted significance values can be compared to each other, and a determination can be made as to which of the print substance formulations is assigned to the third node as the third print substance formulation. In one example, the print substance formulation associated with larger of the weighted significance values is assigned to be the third print substance formulation for the color input.

In an example in which the criteria of the comparison is to select the print substance formulation corresponding with the larger of the weighted significance values, if a first print substance formulation corresponds with a node associated with a first significance factor having a weighted significance value of x and a second print substance formulation corresponds with node associated with a second significance factor having a weighted significance value of y, and x>y, then the first print substance formulation is assigned as the third print substance formulation in the third node.

In another example, the third print substance formulation can be created from a weighted average of the first and second print substance formulations based on the first and second significance factors. The weighted average of the print substance formulation is comparable to an ordinary average of the print substance formulations, except that instead of each of the first and second print substance formulations contributing equally to create the third print substance formulation average, one of the first and second print substance formulation contributes to the third print substance formulation more than the other of the first and second print substance formulation. In one example, the first and second print substance formulation contributes an amount based on the first and second weighted significance value, respectively. Thus, if the first node is associated with a relatively high first weighted significance value and the second node is associated with a relatively low second weighted significance value, the first print substance formulation will contribute more than the second print substance formulation to the third print substance formulation.

The significance factors for source color tables can be assigned with consideration of each other or can be assigned independent of other significance profiles. The example significance profiles for the full-color source color tables and the greyscale color table included weighted significance values for a given color input that would sum to the same value, 1.0. The value of the sum of weighted significance values can be other than 1.0. In examples in which the weighted significance values are used in a weighted average of the first and second print substance formulations to generate the third print substance formulation, the weighted significance values can be normalized to sum to a constant, such as 1.0.

Additionally, the value of the sum of weighted significance values can be different for different nodes. In some examples, a significance profile can be generated without regard to other significance profiles, in which case significance factors for a given color input may be the same in some circumstances, or create other contention in significance factors. Various mechanisms to resolve contention of significance factors can be included to resolve how the third print substance formulation is determined in such circumstances.

In one example, a third node in the target table can be assigned a print substance formulation that is independent of first and second nodes based on the first and second significance factors. For example, if the first and second significance factors elicit a criteria of the comparison, a fourth print substance formulation, which is independent of the first and second print substance formulations, can be assigned to the third node as the third print substance formulation. In one example, the criteria of the comparison can base the third print substance formulation on the first and second print substance formulations unless the significance factors do not meet a threshold value or are equal to each other or some other criteria, in which case a fourth print substance formulation is assigned as the third print substance formulation. For example, the criteria of the comparison is to assign the print substance formulation corresponding with the larger of the significance factors unless the significance factors are less than a selected value or are equal to each other, in which case, a fourth print substance formulation is assigned to the third node.

Figure 2:
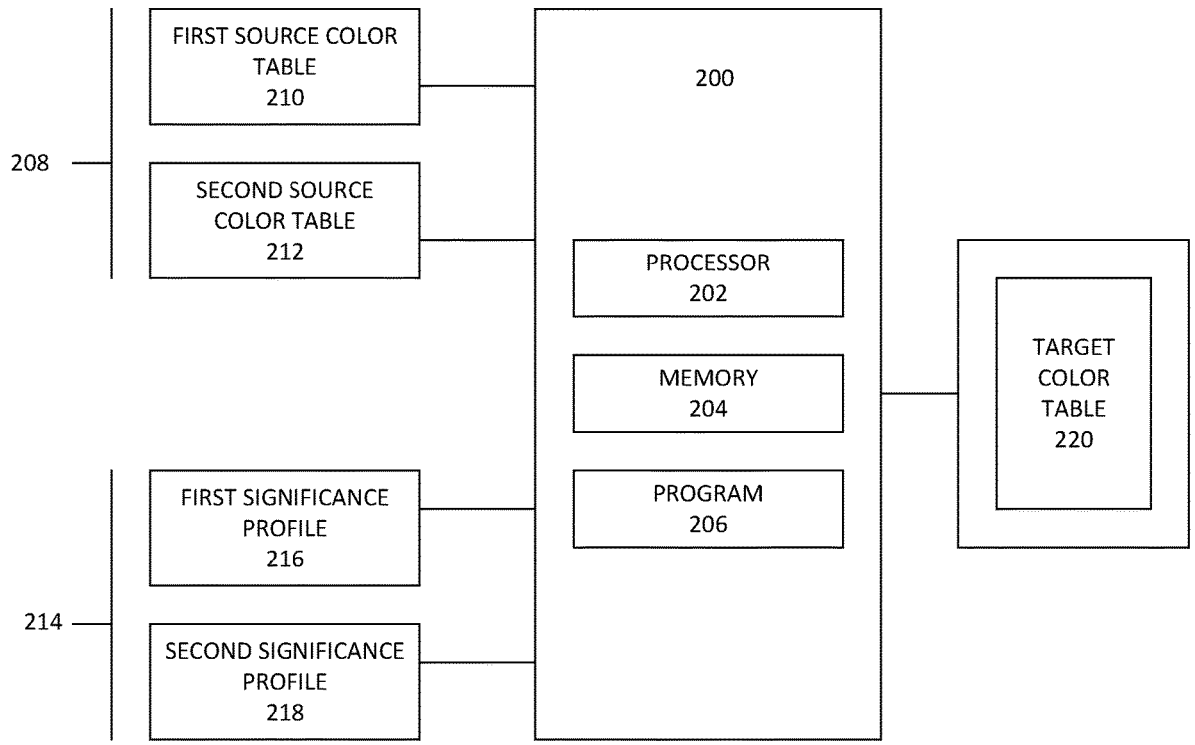
FIG. 2 is a block diagram illustrating an example system to implement the example method of FIG. 1 and produce an example color table.

FIG. 2 illustrates an example system 200 including a processor 202 and memory 204 and program 206 to implement example method 100. System 200 receives the source color table 208, such as the first source color table 210 and the second source color table 212, and the significance factor profiles 214, such as the first significance factor profile table 216 and the second significance factor profile table 218, to generate a target color table 220 on a memory device 222. Source color tables 208 can include a plurality of nodes having print substance formulations stored on a memory device. For example, a color input of a color in a first color space provided to a source color table will provide an output of a print substance formulation for a second color space. Significance factor profiles 214 can include plurality of nodes having significance factors stored on a memory device. For example, a color input provided to a significance factor profile 214 on a memory device will provide an output of a corresponding significance factor. Memory device 222 can be included with a printing device or on a consumable product for use with the printing device such as a printer cartridge. In one example, system 200 can be implemented with a computing device. Program 206 can be implemented as a set of processor-executable instructions stored on a non-transitory computer readable medium such as memory 204. Computer readable media, computer storage media, memory, or memory device may be implemented to include a volatile computer storage media, nonvolatile computer storage media, or as any suitable method or technology for storage of information such as computer readable instructions, data structures, program modules or other data. A propagating signal by itself does not qualify as computer readable media, computer readable storage media, memory, or a memory device. In one example, system 200 can generate a bitstream to be stored on memory device 222 as the target color table 220.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of merging a first source color table with a second source color table, the method comprising:
generating in a memory device a target color table of a color gamut from a plurality of first source nodes in the first source color table, the first source color table having a first significance profile including a plurality of first significance factors associated with the plurality of first source nodes preselected to emphasize or deemphasize a first selected feature of the first source color table, and a plurality of second source nodes in the second source color table, the second source color table having a second significance profile including a plurality of second significance factors associated with the plurality of second source nodes preselected to emphasize or deemphasize a second selected feature of the second source color table, the target color table including a plurality of target nodes corresponding with the plurality of first and second source nodes, for each target node of the plurality of target nodes in the target color table:
  receiving a first significance factor associated with a first source node in the first source color table, the first source node in the first source color table corresponding with a color input in a first color space and providing a first print substance formulation in a second color space for a printing device;
  receiving a second significance factor associated with a second source node in the second source color table, the second source node in the second source color table corresponding with the color input of the first source node in the first color space and providing a second print substance formulation in the second color space for the printing device; and
  generating a target node in the target color table corresponding with the first source node and the second source node, based on applying the first significance factor against the second significance factor, the target node corresponding with the color input in the first color space and providing a target print substance formulation in the second color space for a printing process of the printing device.

2. The method of claim 1 wherein the first significance factor includes a first weighted significance value and the second significance factor includes a second weighted significance value.

3. The method of claim 2 wherein generating the target node includes creating the target print substance formulation from combining the first print substance formulation and the second print substance formulation based on the first and second weighted significance values.

4. The method of claim 3 wherein the combining includes weighted averaging the first print substance formulation and the second print substance formulation based on the first and second weighted significance values.

5. The method of claim 1 wherein the generating the target node of the target color table based on the first significance factor and the second significance factor includes selecting one of the first print substance formulation and the second print substance formulation as the target print substance formulation based on the first and second significance factors.

6. The method of claim 1 wherein the first significance factor is based on the first selected feature of the first source color table including a full chroma primary and secondary colors and the second significance factor is based on the second selected feature of the second source color table including greys and neutrals.

7. The method of claim 1 wherein the first source color table and the second source color table include an equal amount of a plurality of nodes.

8. The method of claim 1 wherein the generating the target node of the target color table based on the first significance factor and the second significance factor includes selecting another print substance formulation as the target print substance formulation based on the first and second significance factors.

9. The method of claim 1 wherein the second color space is a subtractive color space.

10. A system, comprising:
a memory to store a set of instructions; and
a processor to execute the set of instructions to:
generate in a memory device a target color table of a color gamut from a plurality of first source nodes in a first source color table, the first source color table having a first significance profile including a plurality of first significance factors associated with the plurality of first source nodes preselected to emphasize or deemphasize a first selected feature of the first source color table, and a plurality of second source nodes in a second source color table, the second source color table having a second significance profile including a plurality of second significance factors associated with the plurality of second source nodes preselected to emphasize or deemphasize a second selected feature of the second source color table, the target color table including a plurality of target nodes corresponding with the plurality of first and second source nodes, for each target node of the plurality of target nodes in the target color table:
    receive a first significance factor to a first source node in the first source color table, wherein the first source node in the first source color table corresponds with a color input in a first color space and provides a first print substance formulation in a second color space for a printing device;
    receive a second significance factor to a second source node in the second source color table, wherein the second source node in the second source color table corresponds with the color input of the first source node in the first color space and provides a second print substance formulation in the second color space for the printing device; and
    generate a target node in the target color table corresponding with the first source node and the second source node from the first node and the second node based on the first significance factor applied against the second significance factor, wherein the target node corresponds with the color input in the first color space and provides a target print substance formulation in the second color space for a printing process of the printing device.

11. The system of claim 10 wherein the first significance factor is selected from a significance profile included on a memory device.

12. The system of claim 10 wherein the target color table is stored on a memory device operably coupled to a printing device.

13. A non-transitory computer readable medium to store computer executable instructions to control a processor to:
generate in a memory device a target color table of a color gamut from a plurality of first source nodes in a first source color table, the first source color table having a first significance profile including a plurality of first significance factors associated with the plurality of first source nodes preselected to emphasize or deemphasize a first selected feature of the first source color table, and a plurality of second source nodes in a second source color table, the second source color table having a second significance profile including a plurality of second significance factors associated with the plurality of second source nodes preselected to emphasize or deemphasize a second selected feature of the second source color table, the target color table including a plurality of target nodes corresponding with the plurality of first and second source nodes, for each target node of the plurality of target nodes in the target color table:
    receive a first significance factor to a first source node in the first source color table, wherein the first source node in the first source color table corresponds with a color input in a first color space and provides a first print substance formulation in a second color space for a printing device;
    receive a second significance factor to a second source node in the second source color table, wherein the second source node in the second source color table corresponds with the color input of the first source node in the first color space and provides a second print substance formulation in the second color space for the printing device; and
    generate a target node in the target color table corresponding with the first source node and the second source node from the first node and the second node based on the first significance factor applied against the second significance factor, wherein the target node corresponds with the color input in the first color space and provides a target print substance formulation in the second color space for a printing process of the printing device.

14. The non-transitory computer readable medium of claim 13 wherein the target print substance formulation is selected from one of the first print substance formulation and the second print substance formulation based on comparing the first significance factor with the second significance factor.

15. The non-transitory computer readable medium of claim 13 wherein generating the target print substance formulation includes generating a weighted average of the first print substance formulation and the second print substance formulation based on the first and second significance factors.

* * * * *